(12) United States Patent
Smith

(10) Patent No.: US 12,498,301 B2
(45) Date of Patent: Dec. 16, 2025

(54) METHOD AND SYSTEM FOR OBTAINING A SAMPLE OF DRY PRODUCT FROM A RECEPTACLE

(71) Applicant: AGCO Corporation, Duluth, GA (US)

(72) Inventor: Evan Thomas Smith, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 286 days.

(21) Appl. No.: 17/929,343

(22) PCT Filed: Apr. 16, 2021

(86) PCT No.: PCT/IB2021/053143
§ 371 (c)(1),
(2) Date: Sep. 2, 2022

(87) PCT Pub. No.: WO2021/220101
PCT Pub. Date: Nov. 4, 2021

(65) Prior Publication Data
US 2023/0314285 A1 Oct. 5, 2023

Related U.S. Application Data

(60) Provisional application No. 63/018,048, filed on Apr. 30, 2020.

(51) Int. Cl.
*G01N 1/14* (2006.01)
*A01C 7/08* (2006.01)
(Continued)

(52) U.S. Cl.
CPC ............ *G01N 1/14* (2013.01); *A01C 7/085* (2013.01); *A01C 15/006* (2013.01); *A01C 15/04* (2013.01); *A01M 9/003* (2013.01)

(58) Field of Classification Search
CPC ........ G01N 1/14; G01N 1/2211; A01C 7/085; A01C 15/006; A01C 15/04; A01M 9/003
(Continued)

(56) References Cited

U.S. PATENT DOCUMENTS 3,555,910 A * 1/1971 Spence .................... G01N 1/10
73/864.33
3,774,442 A * 11/1973 Gustavsson .......... G01N 1/2247
73/28.04
(Continued)

FOREIGN PATENT DOCUMENTS

CA 2198398 A1 9/1998
CN 205374065 U 7/2016
(Continued)

OTHER PUBLICATIONS

English translation of abstract combined with original of RU2049982C1 (Year: 2024).*
(Continued)

*Primary Examiner* — Kenneth Rinehart
*Assistant Examiner* — Stephanie A Shrieves

(57) ABSTRACT

A sampling system and method are used for extracting a sample of dry product from a receptacle. An extraction tube having a perforated portion is disposed in a product storage volume of the receptacle. A pressurized air source is connected to a first end of the extraction tube. A sample collection device is located outside of the receptacle and serves to separate the sample from an airflow driven by the pressurized air source. An inlet of the sample collection device is connected to a second end of the extraction tube. A sample outlet is adapted to dispense the sample, and an air outlet is provided for venting pressurized air.

13 Claims, 4 Drawing Sheets

Figure 1:
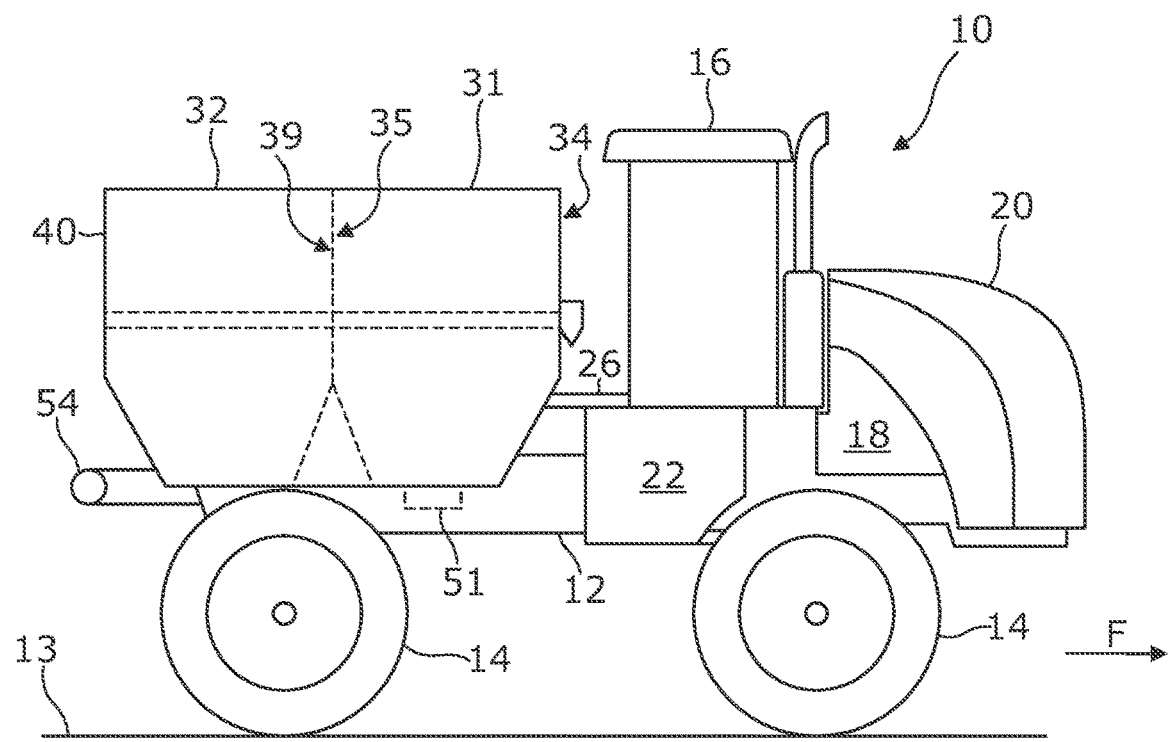

(51) Int. Cl.
  *A01C 15/00* (2006.01)
  *A01C 15/04* (2006.01)
  *A01M 9/00* (2006.01)

(58) Field of Classification Search
  USPC .......................................................... 141/67
  See application file for complete search history.

(56) References Cited

U.S. PATENT DOCUMENTS

| | | | | |
|---|---|---|---|---|
| 3,782,200 | A * | 1/1974 | Maas | G01N 1/20 73/863.51 |
| 4,144,759 | A * | 3/1979 | Slowik | G01N 1/2211 73/863.58 |
| 4,930,359 | A * | 6/1990 | Wolfrum | B07B 7/06 209/237 |
| 6,273,153 | B1 * | 8/2001 | Reinsch | A01C 15/04 141/346 |
| 9,040,905 | B2 * | 5/2015 | Nagano | H01J 49/0468 250/288 |
| 9,915,590 | B1 * | 3/2018 | Humphrey | G01N 1/2035 |
| 11,117,144 | B2 * | 9/2021 | Tamura | B04C 9/00 |
| 2016/0095276 | A1 * | 4/2016 | Roberge | A01C 15/04 239/654 |

FOREIGN PATENT DOCUMENTS

| | | | | |
|---|---|---|---|---|
| CN | 206556895 | U | | 10/2017 |
| CN | 107741444 | A | | 2/2018 |
| CN | 208872536 | U | | 5/2019 |
| GB | 2 307 680 | A1 | | 6/1997 |
| GB | 2307680 | A | * 6/1997 | ........... A01C 15/006 |
| GB | 2562275 | A | * 11/2018 | ......... G01N 33/0009 |
| JP | S51142386 | A | | 12/1976 |
| JP | S51142386 | A2 | | 12/1976 |
| KR | 20150056961 | A | | 5/2015 |
| RU | 2049982 | C1 | * 12/1995 | |
| RU | 2554987 | C2 | * 7/2015 | |
| WO | 2012/129341 | A2 | | 9/2012 |
| WO | 2017/165710 | A1 | | 9/2017 |

OTHER PUBLICATIONS

RU-2049982-C1 English Translation of Specification (Year: 2024).*
RU-2554987-C2 English Translation of Specification (Year: 2024).*
UK Intellectual Property Office, Search report for related UK Application No. GB2010735.5, dated Jan. 13, 2021.
European Patent Office, International Search Report related to International Patent Application No. PCT/IB2021/053143, mail date Jun. 18, 2021.

* cited by examiner

METHOD AND SYSTEM FOR OBTAINING A SAMPLE OF DRY PRODUCT FROM A RECEPTACLE

CROSS-REFERENCE TO RELATED APPLICATIONS

This application is a national phase entry under 35 U.S.C. § 371 of International Patent Application PCT/IB2021/053143, filed Apr. 16, 2021, design ting the United States of America and published in English as International Patent Publication WO 2021/220101 A1 on Nov. 4, 2021, which claims the benefit of the filing date of U.S. Provisional Patent Application 63/018,048, "Method and System for Obtaining a Sample of Dry Product From a Receptacle," filed Apr. 30, 2020, the entire disclosure of which is incorporated herein by reference.

FIELD OF INVENTION

The invention relates to receptacles for product or material, and particularly to the obtaining of a sample of product from the receptacle. In particular, but not exclusively so, the invention relates to receptacles carried on agricultural application machines used in the application of agricultural product to crops.

BACKGROUND

Solid product or material is stored in receptacles in many different fields and applications. In the field of agriculture, application machines serve to apply product in the form of crop inputs which includes pesticides, fertilizers and other nutrient-containing materials. Dry spreaders represent one example of agriculture application machine and serve to apply dry crop inputs and other bulk materials to crop fields, whether that be directly to a growing crop or ahead of crop establishment. By way of example dry crop inputs include bulk, pelleted or granular fertilizer, agricultural lime, and pelleted pesticides.

Driven by environmental and financial factors and by available technology, growers are making more and more effort today to improve the precision with which crop inputs are applied. For example, nitrogen is required by many crops to achieve optimum profit through increased yields. An excess application rate can result in nitrate leaching into ground water or increased crop lodging, thus having a negative impact on the environment and costs. An application rate that is too low will likely not achieve an optimum crop return.

Dry spreaders typically operate by metering product from a product receptacle or 'bin' using a metering device located under the bin, the meter being gravity fed and serving to control the rate of delivery of product to a plurality of dispensing pipes. The metering devices commonly operate on a volumetric basis wherein the volume of product is controlled through the adjustment of a gate in the bottom of the bin for example.

Calibration of the metering devices is often required by environmental legislation and/or farmer assurance standards in order to ensure precision application of the product. A density scale or other device is often used to weigh a known volume of the product before an application task. The determined density value is used as an input parameter to calibrate the metering devices.

Obtaining a sample of the product for calibration can present challenges to the operator. This is especially the case when the bin or bins are filled from a tender vehicle because the operator must then extract the sample from the bin itself. Taking a sample from the top of the bin for example involves climbing into, or reaching into the bin. The risk of falling from height presents a hazard. Moreover, in the case of machines having multiple bins with different products, reaching all of the bins can be difficult and/or hazardous.

It is known to provide a sample collecting hatch which is a simple flap or door in a sidewall of the bin, the hatch allowing an operator to obtain a sample through the sidewall. However, the sample obtained is often not representative of the product held across the volume of the bin. Moreover, for multiple bin machines, the operator is required to access a sidewall of each bin which is time consuming and/or impractical.

SUMMARY OF INVENTION

In accordance with a first aspect of the invention there is provided a sampling system for extracting a sample of product from a receptacle, the system comprising a receptacle having a product storage volume, an extraction tube having a perforated portion that is disposed in the product storage volume, a pressurized air source connected to a first end of the extraction tube, and, a sample collection device disposed outside of the receptacle, and having an inlet connected to a second end of the extraction tube, a sample outlet adapted to dispense the sample, and an air outlet for venting pressurized air.

Perforations in the extraction tube enable product to enter the tube and become entrained and conveyed in an airflow created by the pressurized air. Advantageously, the sample extracted from the receptacle is collected across a wider portion of the storage volume than compared to known sample collecting hatches, thus making the sample more representative of the product held in the receptacle.

The sample collection device serves to separate the entrained product from the airflow and can be conveniently located to allow an operator to receive the collected sample without having to climb into, or reach into the receptacle.

As used herein, the term "dry product" is intended to encompass a wide range of solid granular, pelleted or other dry material including, by way of example only, dry fertilizer, agricultural lime, seeds, grain, aggregates, and dry pesticides.

In one preferred embodiment the sample collection device is configured to generate a cyclone with a pressurized airflow received through the inlet, wherein the cyclone is disposed to separate the sample from the airflow. The fluid dynamics of a cyclone are thus exploited to separate the sample from the, relatively lighter, conveying airflow. The sample collection device preferably comprises a housing having a conical-shaped portion with a diameter that narrows from a wide end to a narrow end, wherein the inlet and air outlet is disposed toward the wide end, and wherein the narrow end is open to provide the sample outlet. The conical-shaped portion has an internal profile that causes the air to be pushed toward the wide end under pressure through the center of the cyclone. The sample outlet is preferably directed downwardly so that gravity accelerates the relatively heavy product sample there through.

The air outlet may be disposed in an end wall of the housing at an end remote the narrow end. The air outlet may, for example, be disposed on top of the housing when the sample outlet is disposed at the bottom. The housing may further comprise a cylindrical portion contiguous with the wide end of the conical-shaped portion, wherein the inlet is configured to direct pressurized air tangentially into the cylindrical portion. The cylindrical portion and tangentially-disposed inlet encourages the cyclone to form.

In one embodiment the system further comprises a valve between the source of pressurized air and the first end of the extraction tube, the valve being arranged to control a flow of pressurized air into the extraction tube. By controlling the airflow through the extraction tube the sample collection process can be switched on and off as required. The valve is preferably located adjacent to the sample collection device to allow an operator to operate the valve when obtaining a sample from the sample collection device.

As described above the invention offers benefits for collecting samples from a receptacle. However, the invention offers further benefits for multi-product sampling systems involving a plurality of receptacles, some of which may be inconveniently located for extracting a sample directly or through a hatch. In one embodiment a multi-product sampling system further comprises a second receptacle having a second product storage volume, a second extraction tube having a perforated interior portion that is disposed in the second product storage volume, a second pressurized air source connected to a first end of the second extraction tube, and, a second sample collection device disposed outside of the first receptacle and the second receptacle, and having an inlet connected to a second end of the second extraction tube, a sample outlet adapted to dispense a sample extracted from the second receptacle, and an air outlet for venting pressurized air. The (first) pressurized air source and the second pressurized air source may be provided by a common air source.

In another embodiment the second extraction tube has a non-perforated interior portion that is disposed in the first product storage volume. The second extraction tube may be routed through the first receptacle which increases design flexibility for the system and allows a plurality of sample collection devices to be grouped or located in the same area to permit easy access for the operator.

In one embodiment the first receptacle is disposed between the second sample collection device and the second receptacle. In such an arrangement, the first receptacle might otherwise obstruct easy access to the second receptacle for obtaining a sample therefrom. By 'piping' the collected sample to a convenient location for the operator, the aforementioned drawbacks of known systems are overcome.

The invention has wide application to a variety of different systems that require extraction of a sample of dry product. However, the invention offers particular advantages when implemented in agricultural application machines. In one embodiment a dry product spreader for applying product to a growing crop is provided, the spreader comprising a wheeled frame, a product application system, and the product sampling system as described above. The product application system is preferably adapted to receive product stored in the receptacle and dispense the product onto a growing crop.

In accordance with a second aspect of the invention there is provided an agricultural dry spreader for applying product to a growing crop, the spreader comprising a wheeled frame, a product application system, and a product sampling system, the product sampling system comprising a receptacle supported on the frame and having a product storage volume bounded by a plurality of walls, an extraction tube having a perforated portion that is disposed inside the product storage volume, a pressurized air source connected to a first end of the extraction tube, and a sample collection device disposed outside of the receptacle, and having an inlet connected to a second end of the extraction tube, a sample outlet adapted to dispense the sample, and an air outlet for venting pressurized air.

In one embodiment a valve is provided between the source of pressurized air and the first end of the extraction tube, the valve being arranged to control a flow of pressurized air into the extraction tube, wherein the valve is located adjacent to the sample collection device to allow an operator to operate the valve when obtaining a sample from the sample collection device. The pressurized air source may comprise an air compressor mounted to the frame. The dry spreader may be self-propelled and comprise a prime mover arranged to deliver a propulsive force to the wheeled frame.

In accordance with a second aspect of the invention there is provided a method of extracting a sample of dry product from a receptacle, the method comprising the steps of directing a flow of pressurized air through a perforated extraction tube from a first end to a second end, wherein the extraction tube has a perforated portion positioned inside a product-holding receptacle, and wherein the second end is located outside of the receptacle, receiving at the second end a sample of product entrained in the flow of pressurized air, and, separating the sample from the flow of pressurized air.

BRIEF DESCRIPTION OF THE DRAWINGS

Further advantages of aspects of the invention will become apparent from reading the following description of specific embodiments with reference to the appended drawings in which:

FIG. 1 is a schematic side view of a self-propelled dry spreader according to a first embodiment;

FIG. 2 is a schematic plan view of the dry spreader of FIG. 1;

FIG. 3 is a block diagram of a multi-product sampling system embodied in the dry spreader of FIG. 1;

FIG. 4 is a schematic view of a sample collection device which forms part of a sampling system according to an embodiment;

FIG. 5 is a perspective view of part of the dry spreader of FIG. 1 showing an operator taking a sample from the sampling system embodied thereon; and, FIG. 6 is a process flow of a method of extracting a sample of dry product according to an embodiment.

DETAILED DESCRIPTION OF EMBODIMENTS

All references cited herein are incorporated herein in their entireties. If there is a conflict between definitions herein and in an incorporated reference, the definition herein shall control.

The illustrations presented herein are not actual views of any agricultural implement or portion thereof, but are merely idealized representations that are employed to describe example embodiments of the present disclosure. Additionally, elements common between figures may retain the same numerical designation.

FIG. 1 illustrates an agricultural application machine in the form of a self-propelled dry spreader 10 which includes a frame 12 supported for movement over the ground 13 on wheels 14 in a generally normal forward direction of travel 'F'. The dry spreader further comprises a cab 16, a prime mover 18, in the form of an internal combustion engine for example, covered by a hood 20, and a fuel tank 22, all supported on the frame 12. The cab 16 is accessed by an operator 99 via a set of steps 24 and an access platform 26 which is provided with a safety rail 28 (omitted from FIG. 5).

As used herein, relative terms such as "forward", "rearward", "left", "right", "transverse", and "longitudinal" are made with reference to the dry spreader 10 which includes a longitudinal axis that runs substantially parallel to the forward direction of travel F.

The dry spreader 10 comprises front and rear bins 31, 32 located behind the cab 16 and carried on the frame 12. The front bin 31 is positioned in front of rear bin 32 and adjacent to, and immediately rearward of, access platform 26.

It should be understood that the bins 31, 32 may be standalone receptacles with independent walls and structure. Alternatively the bins 31, 32 may provided by separate compartments in an integrated structure having one or more partition walls between the receptacles. It should also be understood that, although illustrated with two bins, the dry spreader may in alternative embodiments comprise just one bin or indeed more than two bins. For example, in an alternative embodiment a three bin configuration may include a front bin, a middle bin and a rear bin arranged one behind the other on the frame 12. Moreover, multiple bins may be arranged in a number of different configurations including side-by-side for example.

Each bin 31, 32 provides a receptacle having a product storage volume for holding product or particulate material to be applied to an agricultural field. The bins 31, 32 of the illustrated embodiment have a rectangular open top which may have a protective screen, mesh or guard (not shown) for preventing large objects, including people, from entering the bins.

Front bin 31 has front, rear, left and right walls 34, 35, 36, 37. Likewise, rear bin has front, rear, left and right walls 39, 40, 41, 42. Each wall 34, 35, 36, 37, 39, 40, 41, 42 has a vertical upper portion and a sloping lower portion. The provision of a sloping bin improves flow of the stored product and full emptying of the bin. It should be understood that, in alternative embodiments, the profile of the bin exterior and/or interior may vary. For example, the bin walls may be sloped throughout with a consequential trade off in capacity.

The dry spreader 10 further comprises a product application system carried on frame 12 and designated generally at 45. The product application system 45 is adapted to receive product stored in the bins 31, 32 and dispense the product onto the ground 13 or a growing crop. The product application system 45 comprises a front metering device 51 located under the front bin 31, the metering device 51 configured and operable in a known manner and being operable to meter product from the front bin 51. Likewise, a rear metering device 52 is located under the rear bin 32.

The product application system further comprises a pneumatic product delivery system configured to collect product metered by the metering devices 51, 52 and propel the product through a plurality of dispense pipes designated generally at 54. The dispense pipes extend transversely at the rear of the dry spreader and each terminate at a respective dispense point, wherein the dispense points are disposed at an equal spacing across a working width of the dry spreader 10. In a known manner, left and right sets of the dispense pipes may be foldable into a narrower transport configuration.

In an alternative embodiment the product application system may instead comprise a product broadcast apparatus adapted to broadcast the product onto the field with rotating spreader disks for example.

The dry spreader 10 and general operation thereof has been described above. Reference is invited to US-2019/021221 which describes a self-propelled fertilizer spreader in detail and one in which aspects of the invention may be implemented.

The dry spreader 10 includes a sampling system that operates according to one or more aspects of the invention and serves to allow an operator to extract a sample of dry product from one or both of the front and rear bins 31, 32. Designated generally at 100, the sampling system comprises a first extraction tube 110 which extends in a longitudinal direction through the product storage volume of the front bin 31. In more detail, the first extraction tube 110 extends from a rear end 110R through the rear and front walls 40, 39 of the rear bin 32, and through the rear and front walls 35, 34 of the front bin 31 to a front end 110F. The first extraction tube 110 provides a continuous conduit from the rear end 110R to the front end 110F. Although the extraction tube is preferably straight as shown in the drawings, in alternative embodiments the extraction tube may be arranged to provide a non-straight conduit.

The first extraction tube 110 may be formed from any suitable rigid material such as stainless steel, aluminum or plastic. Many fertilizer products are corrosive and so a material resistant to corrosion through oxidation is preferred. In one embodiment the first extraction tube 110 is 2 to 6 inches (5-15 centimeters) in diameter. However, the tube diameter may vary and be selected depending on the range of products being sampled. Moreover, the cross-sectional shape of the tube may vary to the circular section shown. For example, in an alternative embodiment square section tube may be used instead.

At the locations where the first extraction tube 110 passes through the walls 40, 39, 35, 34 of the bins 32, 31, suitable seals or welds may be provided to hold the tube securely in place and depending on the material of the tube and bins. In one example, a rubber grommet seal may be provided when the bin walls are formed from plastic.

Figure 2:
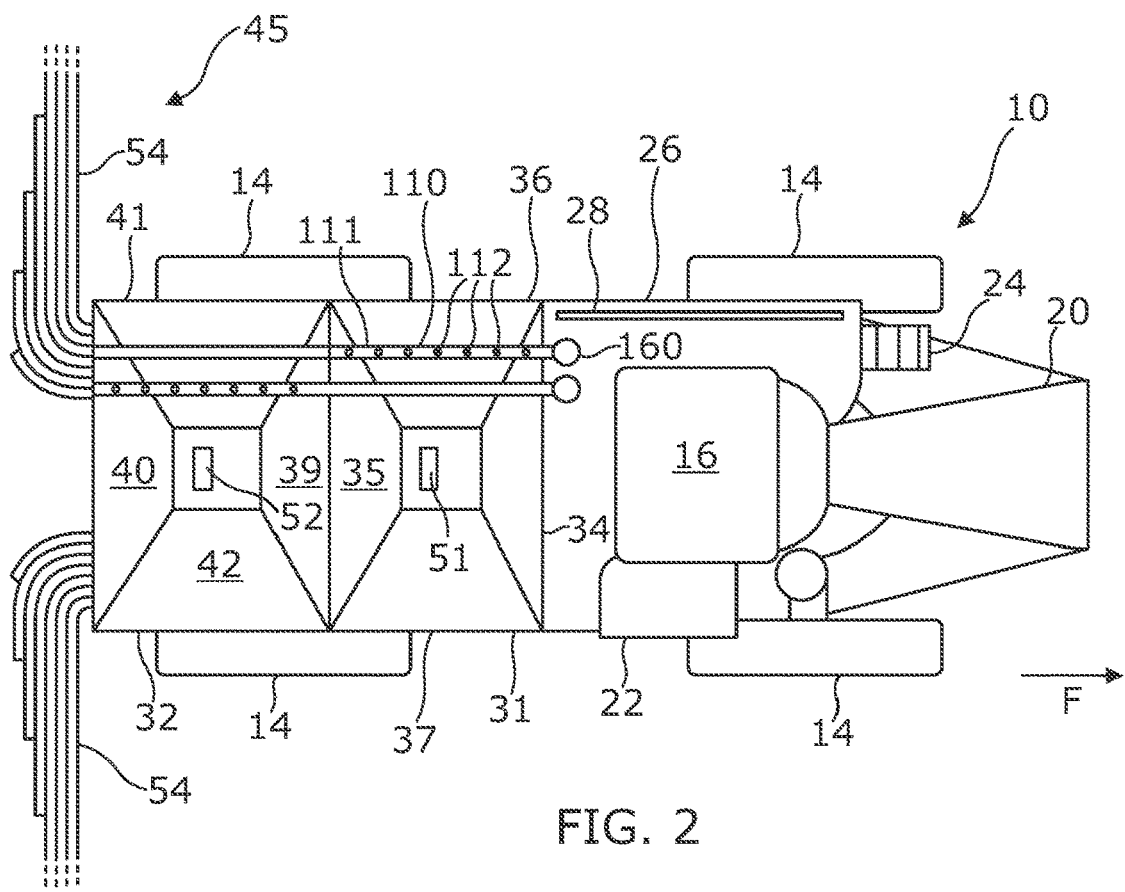
Figure 3:
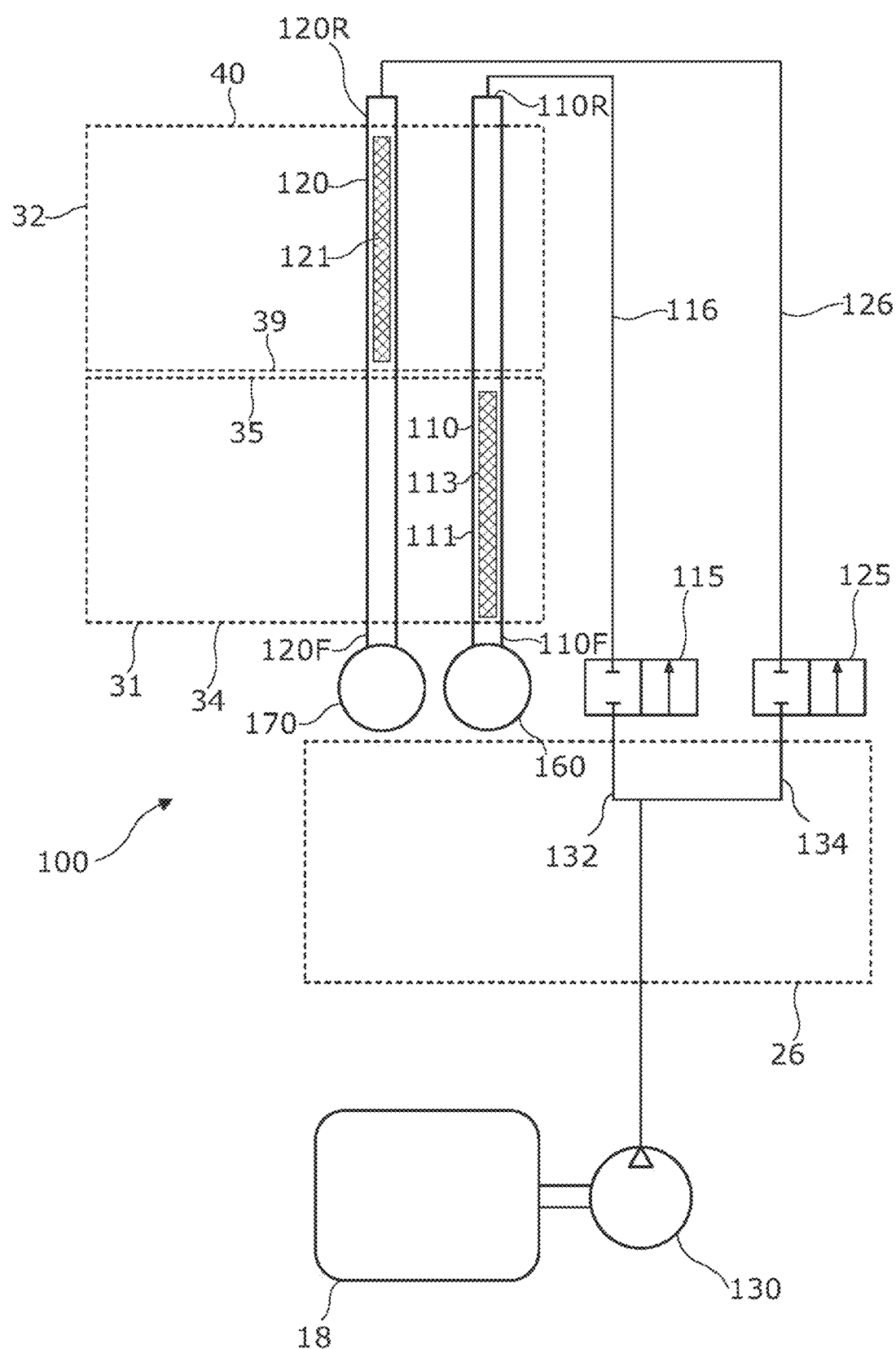

The first extraction tube 110 has a perforated portion 111 located inside the product storage volume of the front bin 31. The perforated portion may comprise, by way of example, a singular hole or a set of holes in the tube wall. The hole or holes may be covered by a screen or mesh. FIG. 2 shows the perforated portion 111 having a set of spaced apart holes 112. For illustrative purposes, FIG. 3 shows the perforated portion 111 having a rectangular hole formed in the tube wall, the hole being covered by a mesh screen 113.

The hole or holes provided in the perforated portion 111 serve to allow a sample of the product or material held in the bin 31 to transfer into the first extraction tube 110. The design choice for the height of the tube 110 relative to the product storage volume may, therefore, be made so as to extract a sample from the desired position in the front bin 31. A lower sampling position will allow a sample to be extracted over a wider range of fill states. For example, even when the bin 31 is less than 25% full a sample may be extracted. However, any sample collected by the extraction tube 110 positioned higher up the product storage volume will be more representative of the product more recently added to the bin 31.

The number and configuration of the holes in the perforated portion also has an effect on the collected sample. The hole or holes are preferably formed in an upward facing part of the wall of extraction tube 110 to allow the product to transfer into the tube under gravity. Moreover, so as to collect a sample that is more representative over the product storage volume, the holes of a set of holes are preferably positioned in a spaced relationship over the length of the extraction tube 110 disposed within the product storage volume of the front bin 31, that is between the rear and front walls 35, 34. If only a single hole is provided in the perforated portion 110, screened or not, then the hole is preferably disposed substantially centrally between the rear and front walls 25, 24 for the same reason.

The cylindrical wall of first extraction tube 110 away from the front bin 31 is impenetrable by product. Therefore, product held in the rear bin 32 cannot transfer into the first extraction tube 110. In an alternative embodiment, an extraction tube may be provided with holes inside multiple bins so as to sample simultaneously from multiple bins. This may be particularly beneficial when a common product is held in multiple receptacles, whether that be in relation to agricultural application machines or otherwise.

Figure 5:
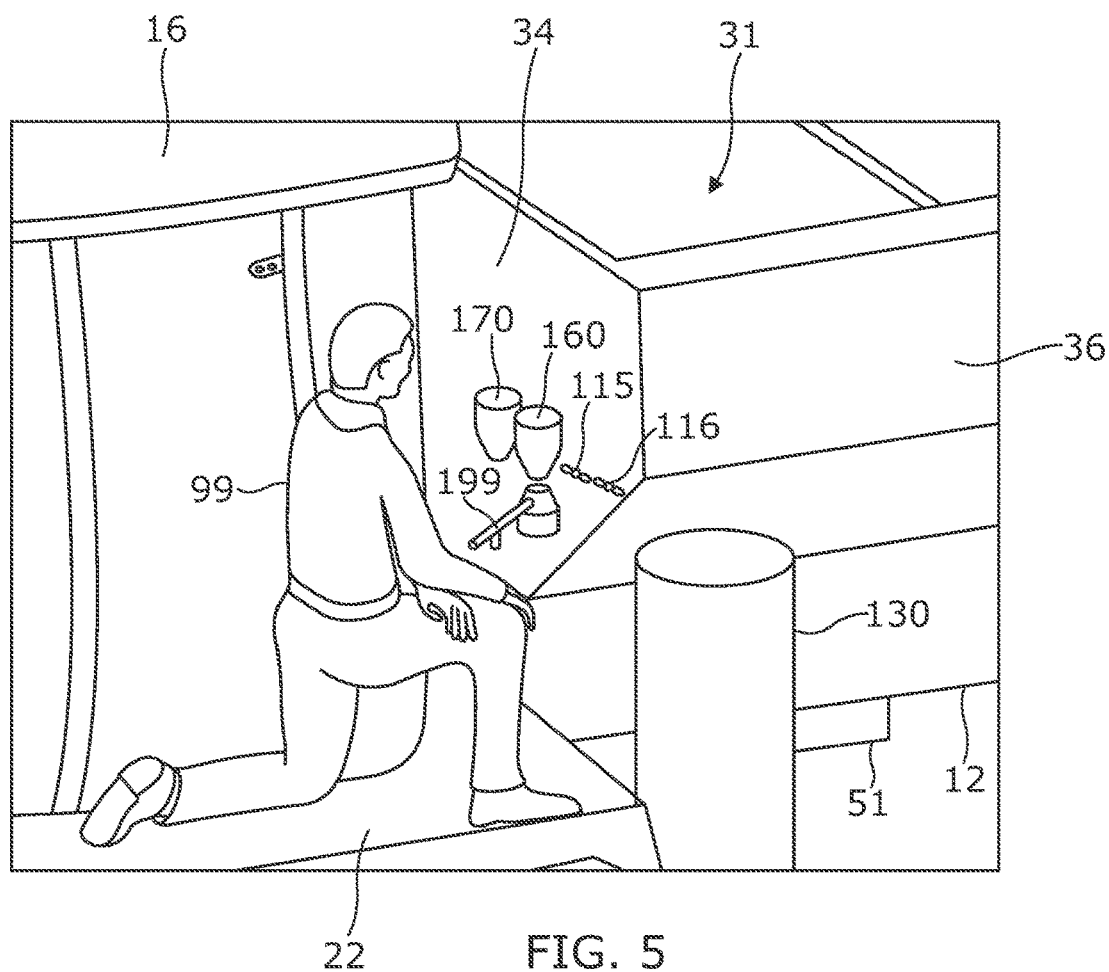
Figure 6:
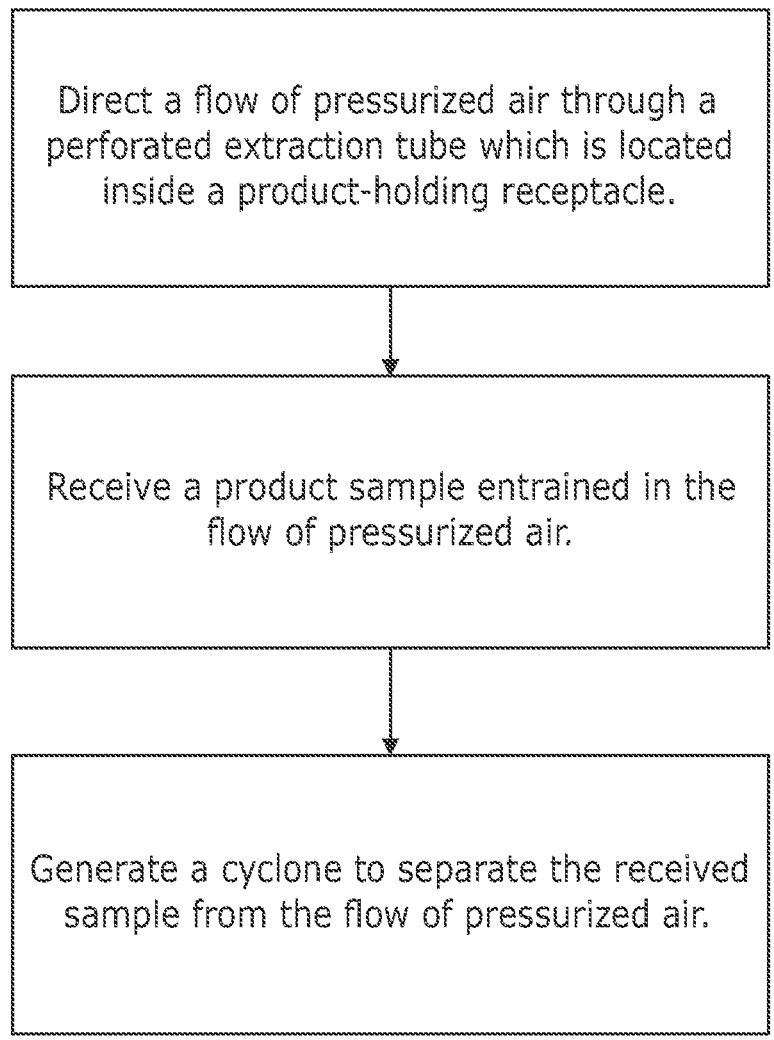

The sampling system 100 further comprises a pressurized air source 132 in the form of an on-board compressor 130 which is connected to the rear end 110R of the extraction tube 110 so as to drive or 'flush' the collected sample in a forward direction through the extraction tube 110. The compressor 130 is carried on the frame 12 and derives power from prime mover 18. The compressor 130 provides a pressurized air source for the pneumatic product delivery system described above and for the sampling system 100, and may be conveniently located, for example, behind the cab 16 as shown in FIG. 5.

A two-position 'on/off' valve 115 is provided in the fluid line between the compressor 130 and the rear end 110R of the extraction tube 110. The valve 115 is arranged to activate/deactivate the flow of pressurized air into the extraction tube 110. In an alternative embodiment the valve 115 is a proportional valve which allows finer control of the airflow. The valve 115 is preferably positioned so as to allow the operator 99 to operate the valve 115 when also collecting the sample, the process for which is described below. In the illustrated embodiment, the valve 115 is mounted on the exterior side of front wall 34 at a height preferably 2-4 feet, or more preferably approximately 3 feet, above the access platform 22.

The pressurized air is conveyed from valve 115 to the rear end 110R of first extraction tube 110 by pneumatic line 116. It should be appreciated that the pneumatic lines shown in FIG. 3 are represented as a simple line for convenience and that the pneumatic lines do actually define a conveyance channel for the airflow which is driven from by compressor 130.

Connected to the front end 110F of the first extraction tube 110 is an inlet 165 of a first sample collection device 160. The sample collection device 160 is disposed outside of the front bin 31, mounted to, or disposed proximate to, the exterior face of front wall 34, and is operable to separate the sample collected by first extraction tube 110 from the airflow in which the sample is entrained. The sample collection device 160 is located adjacent to, or within reach of, the valve 115 to allow an operator 99 to operate the valve 115 when obtaining a sample from the sample collection device 160.

Figure 4:
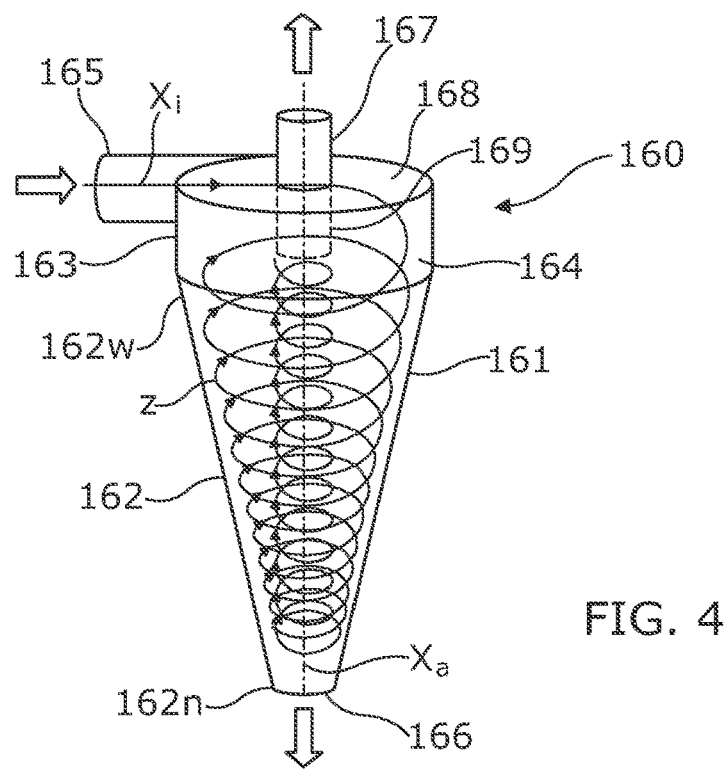

Best shown in FIG. 4, the first sample collection device 160 comprises a housing 161 having a conical-shaped portion 162 with a diameter that tapers or narrows in the axial direction from a wide end 162w to a narrow end 162n. Housing 161 further comprises a cylindrical portion 163 having an end wall 168 and which defines a volume that is contiguous with the wide end 162w of the conical-shaped portion 162. Together, the cylindrical portion 163 and the conical-shaped portion 161 define a continuous interior cyclone chamber 164 having a rotation axis $x_a$.

The inlet 165 is disposed in the radial wall of the cylindrical portion 163, with an inlet axis $x_i$ that is disposed at an angle to the radial axis defined by the cylindrical geometry and rotation axis $x_a$ of cylindrical portion 163. The inlet 165 is thereby configured to direct the airflow (indicated by arrow z) tangentially into the cylindrical portion 163.

The narrow end 162n is open to provide a sample outlet 166 which is adapted to dispense the sample and which is preferably directed downwardly as illustrated.

An air outlet 167 for venting the airflow z is disposed in end wall 168 of the housing 161 remote the narrow end 163n and sample outlet 166. The air outlet preferably comprises a length of tube 169 that extends into the cyclone chamber 164 and which serves to 'find' and direct an updraft portion of the cyclone for ejecting thereof.

The sampling system 100 further comprises an arrangement for extracting a sample of dry product or material from the rear bin 32, the arrangement being the same to that described above in relation to the front bin 31, except for the extraction tube. A second extraction tube 120 extends in a longitudinal direction through the product storage volume of the rear bin 32. In more detail, the second extraction tube 120 extends from a rear end 120R through the rear and front walls 40, 39 of the rear bin 32, and through the rear and front walls 35, 34 of the front bin 31 to a front end 110F. Like the first extraction tube 110, the second extraction tube 120 provides a continuous conduit from the rear end 120R to the front end 120F.

The second extraction tube 120 has a perforated portion 121 located inside the product storage volume of the rear bin 31. A hole or holes provided in the perforated portion 121 serve to allow a sample of the product or material held in the rear bin 32 to transfer into the second extraction tube 120. The cylindrical wall of second extraction tube 120 away from the rear bin 32 is impenetrable by product. Therefore, product held in the front bin 31 cannot transfer into the second extraction tube 120.

The second extraction tube 120 is connected at the rear end 120R to a pressurized air source 134 in the form of the compressor 130 via a second valve 125 and pneumatic line 126. The compressor 130 advantageously serves as a common source 132, 134 of pressurized air for both the first and second extraction tubes 110, 120. Moreover, valves 115, 116 may be conveniently located near to one another (at least both within reach of an operator from a single location) to allow for sample extraction from both bins from a single location.

Connected to the front end 120F of the second extraction tube 120 is an inlet of a second sample collection device 170. The second sample collection device 170 is identical to the first sample collection device 160 described in detail above. The second sample collection device 170 is also disposed outside of the front bin 31, mounted to, or disposed proximate to, the exterior face of front wall 34. For convenience of operation, the second sample collection device 170 is located adjacent to, or within reach of, both valves 115, 116, and the first sample collection device 160.

In the illustrated embodiment, the front bin 31 is disposed between the second sample collection device 170 and the second bin 32. The sample extracted from the second bin 32 is conveyed by the second extraction tube 120 through the product storage volume of the first bin 31. Conveniently the operator 99 can, therefore, obtain a sample from the second bin 32 without having to climb over or around the first bin 31 which would otherwise present an obstacle.

Operation

In operation, an operator 99 can collect a sample of product held in either one or both of bins 31, 32. The operation described above is in relation to collecting a sample from the front bin 31. However, it will be understood that this process can extend to collection from the rear bin 32.

In a first step valve or tap 115 is operated to initiate an airflow driven by compressor 130 through the first extraction tube 110 from front to rear, that is towards the sample collection device 160. Product or material that has transferred into the perforated portion 111 is flushed forwardly towards the sample collection device by the airflow. The product sample entrained in the airflow z is carried into and received by the sample collection device through the inlet 165.

The interior geometry of the cyclone chamber 164 causes the airflow z to rotate around the rotation axis $x_a$, forming a cyclone indicated by the helical path of airflow z shown in FIG. 4. The relatively heavy, solid, sample is separated from the airflow z by falling under gravity and being dispensed through the sample outlet for collection by the operator 99, for example directly into a density scale 199 held in place. The cyclone returns the airflow z on an upwardly-directed helical updraft or 'exit' path before the flow of pressurized air exits the cyclone chamber through the air outlet 167.

The operator 99 turns the valve 115 off when the sample collection process is complete. Any sample collected can be simply returned to the bin 31 through the open top for example.

Before either or both bins 31, 32 are filled, the operator 99 may choose to flush one or both extraction tubes 110, 120 by opening valves 115, 116. Advantageously, this ensures that the next samples collected are representative of the product most recently added to the bin(s).

Although the above-described embodiments involve a self-propelled dry spreader it is envisaged that disclosed sample extraction systems may alternatively be embodied in other agricultural application machines including those configured for being towed and powered by tractors and the like. By way of example the sample extraction systems and methods disclosed herein may be embodied in mounted and trailed fertilizer spreaders.

Furthermore, the sample extraction systems and methods disclosed herein may be implemented in non-agricultural applications. By way of example, storage facilities having silos for holding aggregate or commodities may benefit from implementing sample extraction systems and/or methods that embody aspects of the invention.

In summary there is provided a sampling system and method for extracting a sample of dry product or material from a receptacle. An extraction tube having a perforated portion is disposed in a product storage volume of the receptacle. A pressurized air source is connected to a first end of the extraction tube. A sample collection device is located outside of the receptacle and serves to separate the sample from an airflow driven by the pressurized air source. An inlet of the sample collection device is connected to a second end of the extraction tube. A sample outlet is adapted to dispense the sample, and an air outlet is provided for venting pressurized air.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope as contemplated by the inventors. Further, embodiments of the disclosure have utility with different and various implement types and configurations.

The invention claimed is:

1. A dry product spreader for applying product to a growing crop, the spreader comprising:

- a wheeled frame;
- a first receptacle having a first product storage volume;
- a second receptacle having a second product storage volume;
- a product application system adapted to receive a first product stored in the first receptacle and a second product stored in the second receptacle, and dispense the first product and the second product onto a growing crop;
- a first metering device located under the first receptacle and operable to meter the first product from the first receptacle for delivery to the product application system;
- a second metering device located under the second receptacle and operable to meter the second product from the second receptacle for delivery to the product application system; and
- a product sampling system configured to extract a first sample of the first product from the first receptacle or a second sample of the second product from the second receptacle, the sampling system comprising:
  - a first extraction tube having a perforated portion that is disposed in the first product storage volume above the first metering device;
  - a first pressurized air source connected to a first end of the first extraction tube; and
  - a first sample collection device disposed outside of the first receptacle and the second receptacle, and having a first inlet connected to a second end of the first extraction tube, a first sample outlet adapted to dispense the first sample, and a first air outlet for venting pressurized air;
  - a second extraction tube having a perforated interior portion that is disposed in the second product storage volume above the second metering device and a non-perforated interior portion that is disposed in the first product storage volume;
  - a second pressurized air source connected to a first end of the second extraction tube; and
  - a second sample collection device disposed outside of the first receptacle and the second receptacle, and having a second inlet connected to a second end of the second extraction tube, a second sample outlet adapted to dispense the second sample extracted from the second receptacle, and a second air outlet for venting pressurized air.

2. The dry product spreader of claim 1, wherein the first sample collection device is configured to generate a cyclone with a pressurized airflow received through the first inlet, wherein the cyclone is disposed to separate the first sample from the airflow.

3. The dry product spreader of claim 2, wherein the first sample collection device comprises a housing having a conical-shaped portion with a diameter that narrows from a wide end to a narrow end, wherein the first inlet and first air outlet are disposed toward the wide end, and wherein the narrow end is open to provide the first sample outlet.

4. The dry product spreader of claim 3, wherein the first sample outlet is directed downwardly.

5. The dry product spreader of claim 3, wherein the first air outlet is disposed in an end wall of the housing at an end remote of the narrow end.

6. The dry product spreader of claim 3, wherein the housing further comprises a cylindrical portion contiguous with the wide end of the conical-shaped portion, wherein the first inlet is configured to direct pressurized air tangentially into the cylindrical portion.

7. The dry product spreader of claim 1, further comprising a valve between the first pressurized air source and the first end of the extraction tube, the valve being arranged to control a flow of pressurized air into the first extraction tube.

8. The dry product spreader of claim 7, wherein the valve is located adjacent to the first sample collection device to allow an operator to operate the valve when obtaining a sample from the first sample collection device.

9. The dry product spreader of claim 1, wherein second sample collection device is disposed adjacent to the first sample collection device.

10. The dry product spreader of claim 1, wherein the first receptacle is disposed between the second sample collection device and the second receptacle.

11. The dry product spreader of claim 1, further comprising a valve between the first pressurized air source and the first end of the first extraction tube, the valve being arranged to control a flow of pressurized air into the first extraction tube, wherein the valve is located adjacent to the first sample collection device to allow an operator to operate the valve when obtaining the first sample from the first sample collection device.

12. The dry product spreader of claim 11, wherein the first pressurized air source comprises an air compressor mounted to the frame.

13. The dry product spreader of claim 1, further comprising a prime mover arranged to deliver a propulsive force to the wheeled frame.

* * * * *